United States Patent [19]

Fukagai et al.

[11] 4,225,033

[45] Sep. 30, 1980

[54] DUSTPROOF CHUTE FOR PARTICULATE MATERIAL LOADER

[75] Inventors: Kouichi Fukagai; Kouichi Higashinaka; Kazuo Shirasaki, all of Kumagaya, Japan

[73] Assignee: Hitachi Metals, Ltd., Japan

[21] Appl. No.: 952,665

[22] Filed: Oct. 19, 1978

[30] Foreign Application Priority Data

| Apr. 21, 1978 | [JP] | Japan | 53-47465 |
| Apr. 21, 1978 | [JP] | Japan | 53-47466 |
| Apr. 21, 1978 | [JP] | Japan | 53-47467 |
| Apr. 21, 1978 | [JP] | Japan | 53-47468 |
| Apr. 21, 1978 | [JP] | Japan | 53-47469 |

[51] Int. Cl.$^2$ .................. B65G 65/32; B65G 11/14
[52] U.S. Cl. ................................ 198/524; 141/93; 193/30; 414/291; 414/299
[58] Field of Search .............. 193/6, 25 R, 25 S, 15, 193/30; 198/528, 525, 524; 222/564, 193; 414/139, 291, 299; 141/93, 387, 388, 392

[56] References Cited

U.S. PATENT DOCUMENTS

| 3,010,620 | 11/1961 | Folse | 222/564 |
| 3,858,733 | 1/1975 | Morioka et al. | 193/30 X |
| 3,881,610 | 5/1975 | Hessling | 414/299 X |
| 3,926,290 | 12/1975 | Isojima et al. | 414/139 X |
| 4,061,221 | 12/1977 | Higashinaka et al. | 141/93 X |

Primary Examiner—Robert B. Reeves
Assistant Examiner—Gene A. Church
Attorney, Agent, or Firm—Craig & Antonelli

[57] ABSTRACT

A dustproof chute for a particulate material loader including an airtight elastic tubular member located below a particulate material feeding device and defining by its wall a space below the particulate material feeding device, a discharge end tubular member of small length connected to a lower end of the airtight elastic tubular member, a particulate material stream diameter controlling tubular member located in a space within an upper end portion of the airtight elastic tubular member and permitting a particulate material fed by the particulate material feeding device to flow downwardly therethrough in a stream, and a ventilating space surrounding the particulate material stream diameter controlling tubular member and communicating with the particulate material feeding device. The particulate material stream diameter controlling tubular member has the function of reducing the diameter of a downwardly flowing stream of particulate material and causing the stream to flow substantially through the central portion of the space within the airtight elastic tubular member whereby an inner tube hitherto used in a chute of the prior art can be eliminated. The discharge end tubular member has the function of temporarily holding the downwardly flowing particulate material before it is released from the chute.

6 Claims, 17 Drawing Figures

DUSTPROOF CHUTE FOR PARTICULATE MATERIAL LOADER

BACKGROUND OF THE INVENTION (1) Field of the Invention

This invention relates to chutes for loaders, and more particularly to a dustproof chute for a particulate material loader designed for use in reloading a particulate material which has the effect of preventing the dust from scattering and dispensing with an inner tube customarily used in a chute of the prior art, so that possibilities of occurrence of trouble due to damage to the inner tube can be eliminated.

(2) Description of the Prior Art

One type of dustproof chute for a loader known in the art comprises an inner tubular member for guiding a particulate material in its downward flow, and an outer tubular member located outside the inner tubular member in enclosing relation and serving as a duct collecting dust. The outer tubular member has connected to its lower end in airtight relation a skirt in which the inner tubular member opens at its lower end. A space defined between the inner tubular member and the outer tubular member communicates at its upper end with a dust collecting device.

Figure 1:
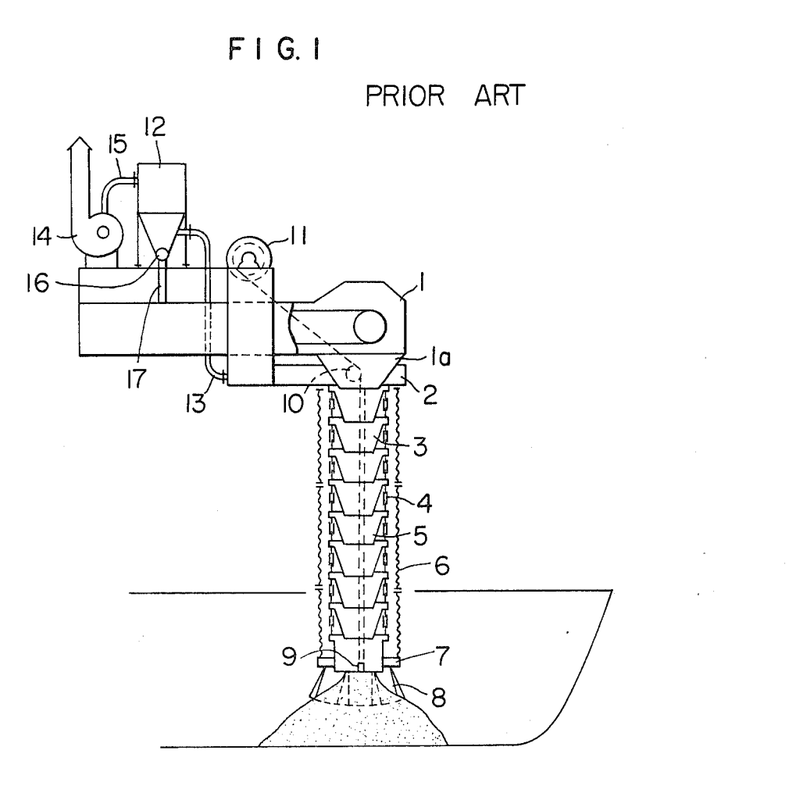
FIG. 1 is a schematic view of a dustproof chute for a particulate material loader of the prior art.

FIG. 1 shows an example of the dustproof chute of the prior art which is considered to be most superior in performance. In FIG. 1, a conveyor 1 has a hopper 1a connected to an upper casing 2 which provides an inner tubular member connecting seat and serves as a dust collecting chamber. The inner tubular member connecting seat has connected thereto in hanging relation a flexible telescopic inner tube 5 comprising a plurality of tapering short tubes 3 arranged successively with a major diameter end of each tube 3 located above and telescopically receiving therein a minor diameter end of the adjacent tube 3, and chains 4 for connecting the tubes 3 together. The dust collecting chamber of the upper casing 2 has connected thereto in airtight relation an outer tubular member 6 in the form of bellows which is formed of canvas or rubber including a rubbery material. The outer tubular member 6 has connected to its lower end in airtight relation, through a lower casing 7, a skirt 8 which can be expanded or contracted as desired. The inner tube 5 has its lower end secured to the skirt 8 so that the inner tube 5 opens at its lower end in a space within the skirt 8.

Winding ropes 9 connected to opposite sides of the lower casing 7 are trained over rollers 10 mounted on opposite sides of the upper casing 2 and wound on a take-up drum 11 located on the conveyor 1. By rotating the take-up drum 11 in a winding direction, it is possible to move the skirt 8 upwardly and to contract the inner and outer tubes 5 and 6. The upper casing 2 communicates, through a dust drawing tube 13, to a dust collector 12 mounted on the conveyor 1. The dust collector 12 communicates with a suction fan 14 through a suction tube 15 and has a rotary valve 16 at its lower portion, the rotary valve 16 being connected to the conveyor 1 through a recovery tube 17.

If the suction fan 14 is actuated while a particulate material is dropped through the hopper 1a as the skirt 8 is maintained in contact with a stacked particulate material, then the particulate material drops through the inner tube 5 and accumulates on the stack. If the angle formed by the slope of the stack and the horizontal exceeds a rest of angle which is natural to the particulate material, the particulate material will roll down the slope of the stack. Meanwhile the dust produced by the particulate material as it drops through the inner tube 5 is passed, by an air current induced by the suction fan 14, through the space between the inner and outer tubes 5 and 6 and the upper casing 2 to the dust collector 12 where the dust is separated from the air current. The dust separated from the air current is recovered, through the rotary valve 16, to the conveyor 1. In this way, the scattering of the dust is prevented.

Some disadvantages are associated with the dustproof chute of the aforesaid construction of the prior art. The chute is of double wall construction and both complex in construction and heavy in weight. The inner tube of the chute which is brought into direct contact with a particulate material would undergo wear and have to be repaired often. Since the dust collector and fan for drawing the dust are mounted in high positions, the chute would lack stability when an earthquake or storm attacks the loading apparatus. The skirt has an expanding and contracting mechanism which is complex in construction and large in size, so that great damage and wear would be caused to its airtight moving parts. When a land transportation means, such as a truck, which is smaller than a ship, is loaded with a particulate material, the aforesaid dustproof chute of the prior art would be too large in scale to permit one to handle it with ease.

SUMMARY OF THE INVENTION

This invention obviates the aforementioned disadvantages of the prior art. Accordingly, one object of the invention is to provide a dustproof chute for a particulate material loader which can be used with a land transportation means of relatively small size.

Another object is to provide a dustproof chute for a particulate material loader including an elastic tubular member of light weight and airtight construction capable of expanding and contracting which defines by its wall a space below a particulate material feeding device, and a particulate material stream diameter controlling tubular member of small length located in the space within the elastic tubular member in a position corresponding to an upper end portion of the elastic tubular member for controlling the diameter of a stream of particulate material flowing downwardly through the elastic tubular member, whereby an inner tube of the prior art can be dispensed with.

Another object is to provide a dustproof chute for a particulate material loader including a discharge end tubular member of small length connected to a lower end of the elastic tubular member, and a deflecting member mounted in a lower portion of the space within the elastic tubular member to permit a downwardly flowing particulate material to temporarily stay in the discharge end tubular member before the material is released from the chute to outside. By this feature, the production of powdery dust from the particulate material released from the chute to outside can be minimized, and the downwardly flowing stream of particulate material can be prevented from directly hitting the floor.

Still another object is to provide a dustproof chute for a particulate material loader including a plurality of hanging screens formed of an elastic material and arranged in the space within the elastic tubular member, in place of an inner tube of the prior art, for correcting a stream diameter controlling action performed by the particulate material stream diameter controlling tubular member so as to prevent the downwardly flowing stream of particulate material from inadvertently impinging on the inner wall surface of the elastic tubular member.

A further object is to provide a dustproof chute for a particulate material loader including at least one bag filter mounted in a space within an upper casing for collecting dust. The dust collected by the filter being returned to the space within the elastic tubular member. This feature enables the center of gravity of the loader device as a whole to be moved downwardly and also prevents the dust from being released to outside.

DETAILED DESCRIPTION OF THE PREFERRED EMBODIMENTS

Figure 2:
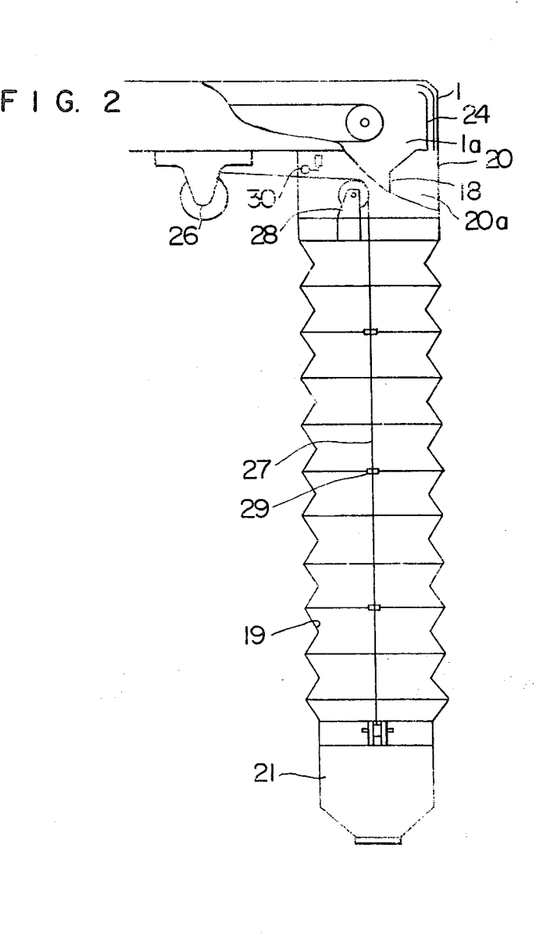
FIG. 2 is a schematic side view, with certain parts being cut out, of the dustproof chute for a particulate material loader comprising one embodiment of the invention.
Figure 3:
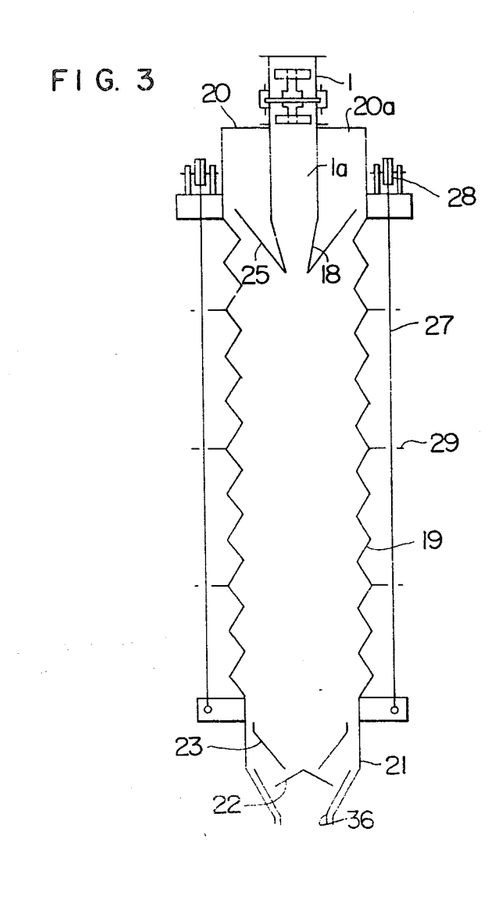
FIG. 3 is a sectional view of the chute shown in FIG. 2, showing its internal structure.
Figure 4A:
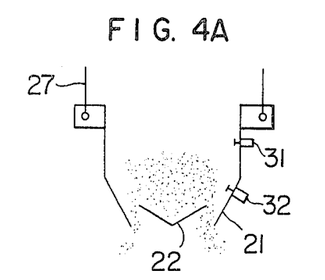
FIGS. 4A to 4J show modifications of the discharge end tubular member connected to the lower end of the elastic tubular member.
Figure 4B:
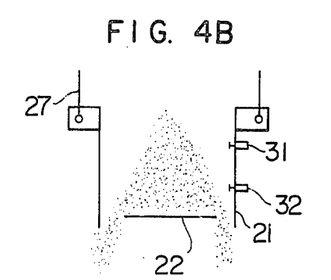
Figure 4C:
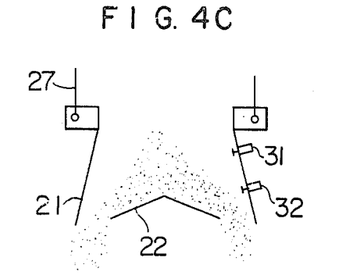
Figure 4D:
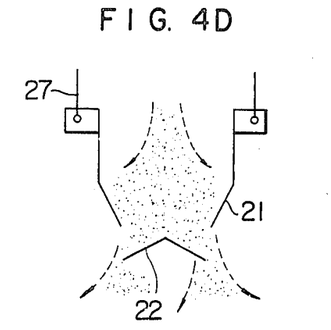
Figure 4E:
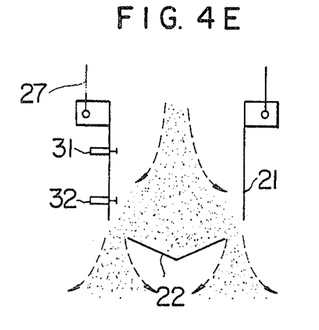
Figure 4F:
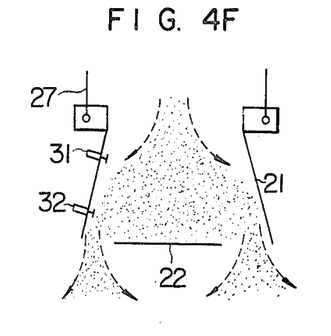
Figure 4G:
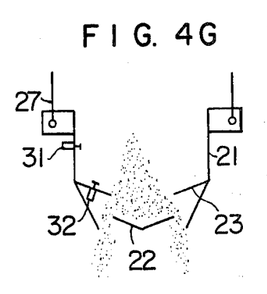
Figure 4H:
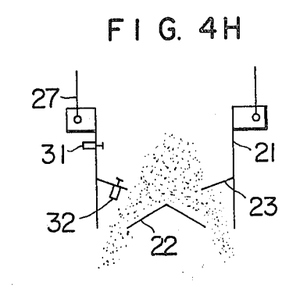
Figure 4I:
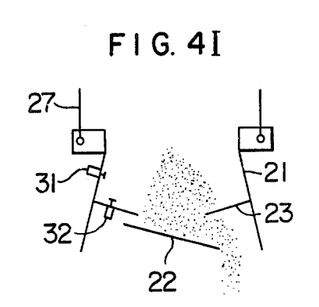
Figure 4J:
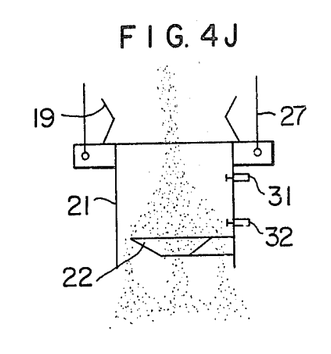

FIGS. 2 and 3 show one embodiment of the invention comprising a particulate material stream diameter controlling tubular member 18 in the form of a short tube having a downwardly tapering lower portion and connected to the hopper 1a of the conveyor 1 for conveying a particulate material, so that a stream of particulate material flowing downwardly through the chute will be formed into a stream of small diameter. Located beneath the conveyor 1 in a manner to enclose the diameter controlling tubular member 18 and spaced part therefrom is an airtight elastic tubular member 19 of light weight formed as a bellows-like air tube capable of expanding and contracting, by bonding elastic thin films to a plurality of rods which form a framework. The elastic tubular member 19 is hung from an upper casing 20 and has connected to its lower end a discharge end tubular member 21 having sufficiently high strength to withstand the impact of downwardly flowing particulate material and an internal space large enough to let the particulate material temporarily stay therein before the material is released from the chute. The discharge end tubular member 21 has a downwardly tapering lower portion, and a deflecting member 22 is mounted near a lower opening of the tubular member 21 in a manner to cross the path of the downwardly flowing stream of particulate material through the tubular member 21.

A downwardly tapering shock absorbing tubular member 23 may be mounted above the deflecting member 22 if necessary. A ventilating tubular member 24 (See FIG. 2) communicating a space surrounding the stream diameter controlling tubular member 18 with the conveyor 1 extends through the upper casing 20 from which the elastic tubular member 19 is hung. A minuscule particle receiving tubular member 25 which is tapering in a downwardly direction is supported at its minor diameter end by the stream diameter controlling tubular member 18 in the vicinity of a lower opening of the latter.

A winding device 26 is secured to the underside of the conveyor 1 and has a plurality of winding ropes 27 trained over the device 26 and having lower ends connected to the outer surface of the discharge end tubular member 21. Guide rollers 28 are mounted on the outer surfaces of the conveyor 1 and upper casing 20 for guiding the winding ropes 27 to depend vertically from above along the outer wall surface of the elastic tubular member 19 having the discharge end tubular member 21 connected to its lower end and hung from the upper casing 20. Secured through the outer wall surface of the elastic tubular member 19 to the rods forming the framework of the member 19 are guide rings 29 through which the winding ropes 27 extend.

Interposed between the winding device 26 and the uppermost guide rollers 28 are detectors 30 with rollers connected to a switch (not shown) for stopping the paying-out of the ropes 27 by the winding device 26 and secured to the upper casing 20 through brackets or other suitable means. The detectors 30 are yieldably maintained in rolling engagement with the ropes 27 irrespective of whether the ropes 27 are tensioned or loosened. The detectors 30 may be alternatively secured to the conveyor 1.

As shown in FIGS. 4A to 4J, an upper level meter 31 and a lower level meter 32 are mounted on the inner wall surface of the discharge end tubular member 21 in positions vertically spaced apart from each other. The upper level meter 31 is connected to a winding starting switch (not shown) of the winding device 26, and the lower level meter 32 is connected to a winding stopping switch (not shown) of the winding device 26.

The operation of the chute constructed as aforementioned will now be described. The particulate material stream diameter controlling tubular member 18 controls the diameter of a downwardly flowing stream of particulate material in such a manner that the stream has a high density in the vicinity of the point at which the particulate material begins to flow downwardly in a stream and the contact of the downwardly flowing stream of particulate material with the inner wall surface of the elastic tubular member 19 is avoided, so that an intermediate particulate material guiding tube portion corresponding to the inner tube 5 of the prior art shown in FIG. 1 can be dispensed with. By this arrangement, the elastic tubular member 19 can be formed as a tubular member of light weight without taking into consideration the strength and abrasion characteristics of the tubular member 19.

The elastic tubular member 19 has the function of inhibiting the drifting of the downwardly flowing stream of particulate material or the scattering thereof which would be caused by an air current prevailing outside the chute if no elastic tubular member 19 were provided, and the function of forming a guiding space for drawing off powdery dust which is produced when the downwardly flowing stream of particulate material reaches its destination. The elastic tubular member 19 may be expanded or contracted as desired depending on the amount of particulate material dropped and stacked on the floor.

The discharge end tubular member 21 of small length connected to the lower end of the elastic tubular member 19 reinforces the lower end portion of the chute so that the chute can withstand the shock of collision with the dropping and rebounding particulate material. At the same time, the short tubular member 21 enables the downwardly flowing stream of particulate material to temporarily stay therein before the particulate material is released from the chute as subsequently to be described. The discharge end tubular member 21 thus inhibits the leakage of a dust containing gas through the lower end of the chute by virtue of the resistance offered by the temporarily staying particulate material to an air current.

The shock-absorbing tubular member 23 and the deflecting member 22 receive the particulate material flowing downwardly in a stream through the elastic tubular member 19 and let it stay temporarily thereon. The wear which would be caused to the shock-absorbing tubular member 23 and the deflecting member 22 themselves is lessened by the particulate material temporarily staying thereon and acting as a shock-absorbing material. Thus the shock-absorbing tubular member 23 and the deflecting member 22 have the effect of limiting the rate at which the particulate material is released through the lower end of the chute to a predetermined range of values.

If the deflecting member 22 is cone-shaped, the member 22 is capable of limiting the rate of flow of the particulate material to a predetermined range of values even if the diameter of the lower open end of the tubular member 21 is increased to prevent the occurrence of a bridging phenomenon in the tubular member 21. If the deflecting member 22 is shaped as an inverted frustum, the particulate material is stacked thereon to form a secondary cone on the member 22 at an angle of rest which is natural to the particulate material, so that the rate of flow of the particulate material can be limited in such a manner that the wear and shock are absorbed by the secondary cone. If the deflecting member 22 has a planar surface inclined in one direction, the member 22 is capable of collecting the particulate material and letting it flow downwardly even if the particulate material is reduced in amount.

The ventilating tubular member 24 performs the function of freely controlling the quantity of air in the elastic tubular member 19, so that the air suction device shown in FIG. 1 can be dispensed with.

The minuscule particle receiving tubular member 25 permits the minuscule particles recovered from a space 20a in the upper casing 20 to join the stream of particulate material freely flowing downwardly through the elastic tubular member 19.

The winding device 26, winding ropes 27, guide rollers 28 and guide rings 29 vertically move the discharge end tubular member 21 upwardly or downwardly depending on the height of a stack of particulate material dropped through the chute and formed on the floor. At the same time, they avoid the flexing of the elastic tubular member 19 to ensure that the particulate material flows downwardly into the discharge end tubular member 21. The discharge end tubular member 21 is gradually moved upwardly so that the particulate material may flow downwardly through the discharge end tubular member 21 at all times.

When the discharge end tubular member 21 is brought into contact with the stack of particulate material on the floor, the detectors 30 provided with rollers detect the loosening of the winding ropes 27 and cause the winding device 26 to stop the paying-out of the ropes 27 to avoid flexing of the elastic tubular member 19.

The upper limit meter 31 detects the height of the upper surface of the stack of particulate material in the discharge end tubular member 22 and causes the winding device 26 to wind the ropes 27 to move the discharge end tubular member 21 to a height such that the rebounding particulate material does not strike the elastic tubular member 19. The lower limit meter 32 detects that the amount of the particulate material staying in the tubular member 21 has reached a lower limit and causes the winding device 26 to stop the operation of winding the ropes 27 for moving the discharge end tubular member 21 upwardly, so that the particulate material in the tubular member 21 will be prevented from flowing out of the member 21 and a reduction in the resistance offered by the residual particulate material to an air current will be prevented so as to avoid the leakage of a dust containing gas from the chute.

In the embodiment constructed as aforesaid, the elastic tubular member extending vertically from the upper casing is disposed in spaced-apart enclosing relation to the short tubular member for controlling the diameter of a downwardly flowing stream of particulate material so that the elastic tubular member may be spaced apart from the downwardly flowing stream by an open space. The elastic tubular member communicates at its upper end with the particulate material feeding device and is connected at its lower end to the discharge end tubular member of small length for temporarily holding the particulate material. By this arrangement, the particulate material flows downwardly in a stream from the particulate material stream diameter controlling tubular member into the discharge end tubular member even if there is no tubular member in the intermediate portion to connect the upper and lower tubular members together. The particulate material temporarily staying in the discharge end tubular member before being released from the chute blocks the entry of air through the discharge opening of the chute and reduces the speed at which the particulate material is released from the chute. Means is provided for returning in circulation excess air from the space within the elastic tubular member to the particulate material feeding device. Thus the chute according to the invention dispenses with the inner tube, dust collecting and recovering device and expansible and contractible skirt of the prior art, and is of simple construction, light in weight and easy to handle and maintain.

Figure 5:
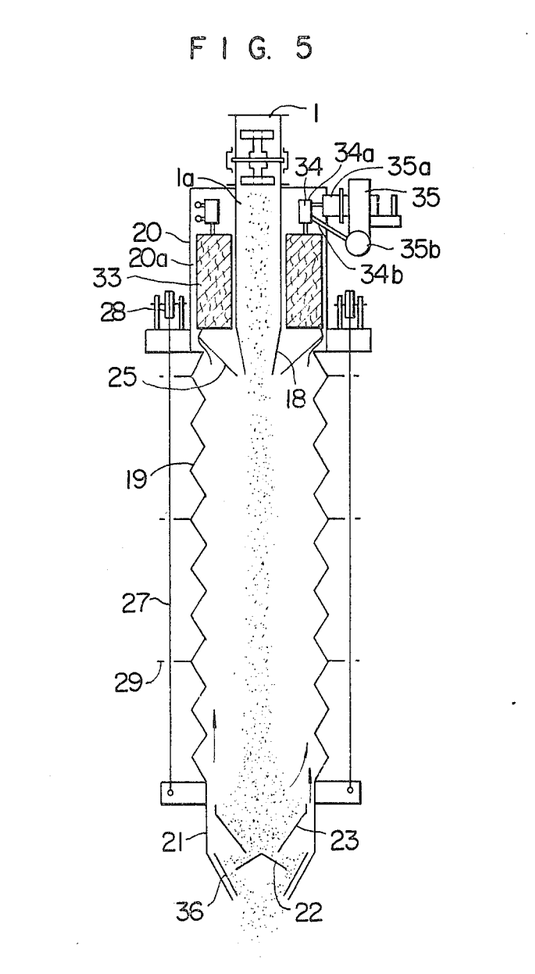
FIG. 5 is a schematic sectional view of the dustproof chute for a particulate material loader comprising another embodiment of the invention.

FIG. 5 shows another embodiment of the invention which is distinct from the embodiment shown in FIGS. 2 and 3 in that the former is provided with a plurality of bag filters 33 mounted in the space 20a within the upper casing 20 as shown in FIG. 3. More specifically, the upper casing 20 from which the elastic tubular member 19 is hung has arranged in the space 20a a plurality of bag filters 33 located to the outer periphery of the particulate material stream diameter controlling tubular member 18 and connected at their upper portions to change-over valves (preferably electromagnetic valves) 34 respectively. Located beneath the bag filters 33 is the minuscule particle receiving tubular member 25 of the downwardly tapering tubular shape which is supported at its minor diameter end by the tubular member 18 in the vicinity of the lower open end of the latter. A dust collecting fan 35 is mounted outside the upper casing 20 and has its suction side connection to dust suction ports 34a of the change-over valves 34 and its exhaust side connected to flow direction reversing ports 34b of the change-over valves 34.

Another feature which distinguishes this embodiment from the embodiment shown in FIGS. 2 and 3 is a short inner tube 36 arranged inside the discharge end tubular member 21 in spaced-apart relation to the downwardly tapering lower portion of the tubular member 21 to define therebetween a passage which cooperates with the fan 35 and positively draws into the discharge end tubular member 21 the powdery dust which floats above the particulate material deposited in a stack after being dropped through the chute.

Figure 6:
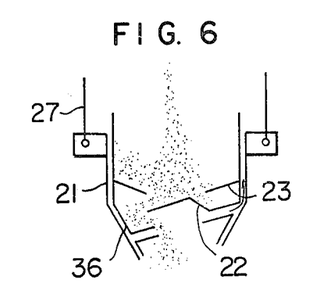
FIG. 6 shows a modification of the air passage formed between the inner tubular member of small length and the discharge end tubular member connected to the lower end of the elastic tubular member.

During the operation of the chute, the change-over valves 34 alternately pass air to the bag filters 33 when necessary to prevent obturation thereof. To enable the passage defined by the short inner tube 36 and the short tubular member 21 to efficiently perform a dust drawing operation, the tubular member 36 may be modified as shown in FIG. 6. It will be seen that the inner tubular member 36 extends along the length of the tubular member 21 and the passage defined therebetween is formed with branches which extend from different portions of the tubular member 36 into a space within the tubular member 21. When the spacing within the tubular member 21 is in this condition, an air current directed in the direction of an arrow is formed, thereby increasing the dust drawing effect.

Figure 7:
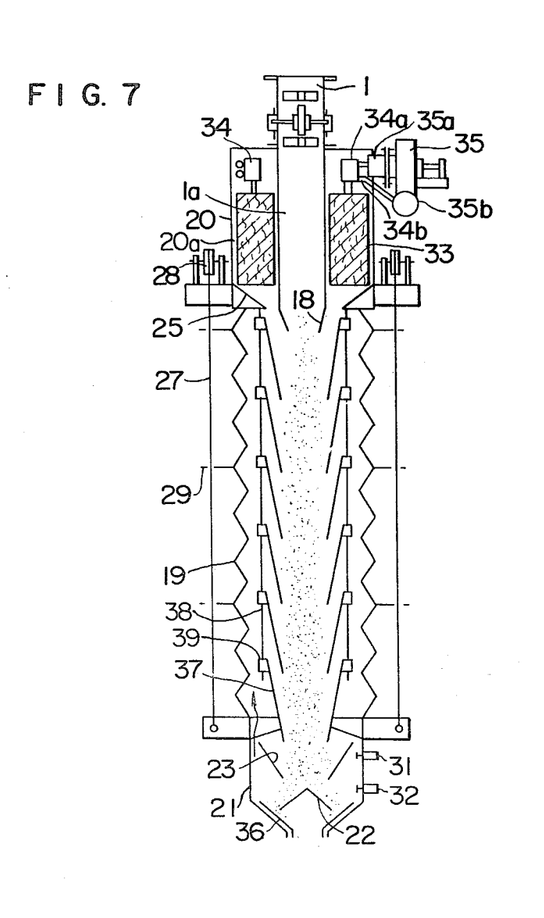
FIGS. 7 and 8 show modifications of the chute shown in FIG. 3.

The embodiment shown in FIG. 7 is similar to the embodiment shown in FIG. 5 except that a plurality of hanging screens 37 formed of an elastic material in strip form are arranged in the space within the elastic tubular member 19. The hanging screens 37 are hung from rings 39 attached to elastic ropes 38 connected at their upper ends to the minuscule particle receiving tubular member 25. By this arrangement, the downwardly flowing stream of particulate material is prevented from impinging on the elastic tubular member 19 even if the stream is disturbed and the particulate material is scattered radially of the tubular member 19, because the hanging screens 37 have the effect of blocking the flow of the particulate material toward the tubular member 19.

Figure 8:
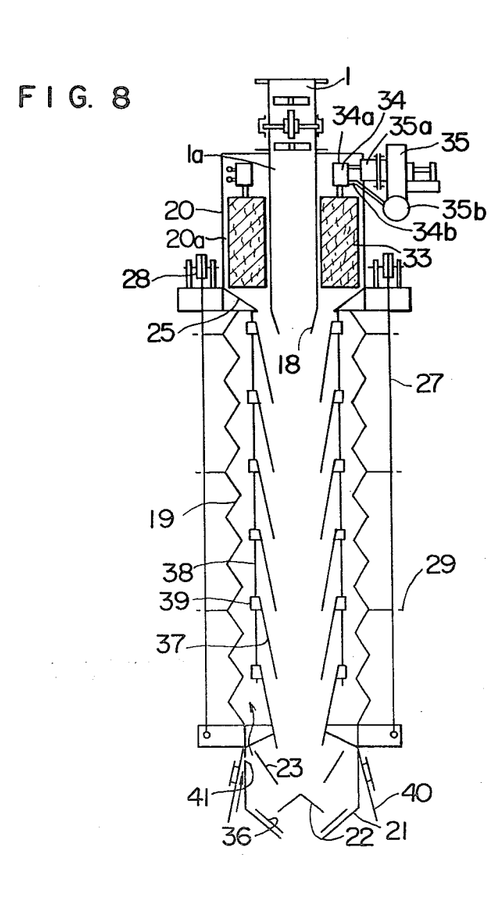

The embodiment shown in FIG. 8 is similar to the embodiment shown in FIG. 7 except that a skirt 40 is provided to the discharge end tubular member 21, and a suction opening 41 is defined between the skirt 40 and the outer periphery of the upper portion of the tubular member 21 for drawing, in the direction of an arrow into the elastic tubular member 19, the powdery dust floating in an open space defined by the skirt 40.

What is claimed is:

1. In a particulate material loader adapted with a material feeding device:
   a dustproof chute comprising:
   (a) an air-tight, elastic tubular member;
   (b) a discharge end tubular member connected to a lower end of said air-tight, plastic tubular member with said discharge end tubular member comprising a shock absorber tubular member, a deflecting member, and an inner tube;
   (c) a particulate material stream diameter controlling tubular member located within said elastic tubular member adapted to communicate with said feeding device;
   wherein:
   said shock absorbing tubular member is adapted to receive a downward flow of particulate materials,
   said deflecting member is adapted to cross a downward flow path of said particulate materials, and
   said inner tube is arranged inside said discharge end tubular member so as to define a passage which cooperates with a fan;
   whereby:
   a downward flow of particulate material would avoid contact with said air-tight, elastic tubular member and temporarily stay in said discharge end tubular member, and
   the powdery dust which floats above the deposited particulate material would be drawn into said discharge end tubular member through said passage defining inner tube by said fan.

2. The dustproof chute of claim 1, wherein said particulate material stream diameter controlling tubular member is downwardly tapered.

3. The dustproof chute of claim 1, wherein said discharge end tubular member is downwardly tapered.

4. The dustproof chute of claim 1, wherein said particulate material stream diameter controlling member further comprises a miniscule particle receiving tubular member.

5. The dustproof chute of claim 4, wherein said miniscule particle receiving tubular member further comprises bag filters which communicate with said dust collecting fan.

6. The dustproof chute of claim 3, wherein said passage defining inner tube inside said discharge end tubular member is arranged in spaced-apart relation to said downward taper.

* * * * *